United States Patent
Kessler et al.

(10) Patent No.: US 6,701,673 B1
(45) Date of Patent: Mar. 9, 2004

(54) OPENABLE AND CLOSABLE MOTOR VEHICLE WINDOW

(75) Inventors: Michael Kessler, Offenbach (DE); Peter Hagedorn, Seeheim-Jugenheim (DE); Hans Jürgen Salzburger, Neunkirchen (DE); Ansgar Wilbrand, Rees-Haldern (DE)

(73) Assignee: Brose Fahrzeugteile GmbH & Co. KG, Coburg (DE)

( * ) Notice: Subject to any disclaimer, the term of this patent is extended or adjusted under 35 U.S.C. 154(b) by 0 days.

(21) Appl. No.: 08/481,199

(22) Filed: Jun. 7, 1995

Related U.S. Application Data

(63) Continuation of application No. 08/060,906, filed on May 12, 1993, now abandoned.

(30) Foreign Application Priority Data

May 13, 1992 (DE) .......................................... 42 15 744

(51) Int. Cl.[7] .................................................. E06B 3/00
(52) U.S. Cl. .............................................. 49/506; 49/28
(58) Field of Search ............................... 49/26, 27, 28, 49/506

(56) References Cited

U.S. PATENT DOCUMENTS

| | | | | |
|---|---|---|---|---|
| 3,727,348 A | * | 4/1973 | Steinmann et al. | ............ 49/28 |
| 4,023,156 A | * | 5/1977 | Galvin | ............ 340/274 R |
| 4,351,016 A | * | 9/1982 | Felbinger | ............ 49/28 R |
| 4,458,445 A | * | 7/1984 | Sauer et al. | ............ 49/26 |
| 5,229,748 A | * | 7/1993 | Ehringer et al. | ............ 340/566 |
| 5,410,227 A | * | 4/1995 | Toyozumi et al. | ............ 49/26 |

FOREIGN PATENT DOCUMENTS

| | | | |
|---|---|---|---|
| DE | 2246337 | 4/1974 | |
| DE | 2432063 | 1/1976 | |
| DE | 2127207 | * 6/1978 | .................... 49/28 |
| DE | 2719955 | 11/1978 | |
| DE | 3034118 | 3/1982 | |
| DE | 3136746 | 6/1983 | |
| DE | 3528380 | 2/1987 | |
| DE | 3236631 | 3/1988 | |
| DE | 3712950 | 11/1988 | |
| DE | 3438050 | 4/1989 | |
| GB | 1347474 | * 2/1974 | .................... 49/28 |

OTHER PUBLICATIONS

Dr. Dan Russell, "Acoustics Animations", Acoustics and Vibrations Animations page, http://WWW.gmi.edu, 2001.

* cited by examiner

*Primary Examiner*—Jerry Redman
(74) *Attorney, Agent, or Firm*—Christie, Parker & Hale, LLP

(57) ABSTRACT

Device for restricting or controlling and regulating the movement of remote-controlled parts, more particularly parts of a vehicle bodywork as well as a process for operating the device. The device and process can be used with particular advantage as a collision protection for window winders, sunroofs, doors or flaps, more particularly in connection with electrical displacement devices for motor vehicles. The device is characterized by an actuator and a sensor which are mounted on a cohesive uninterrupted transmission path which is a constituent part of the closing surface area of the remote-controlled part and/or of the fixed part interacting therewith. The arrangement is selected so that a part of the energy supplied by actuator is converted into acoustic surface waves which can scatter over the transmission path and can be received by the sensor.

20 Claims, 6 Drawing Sheets

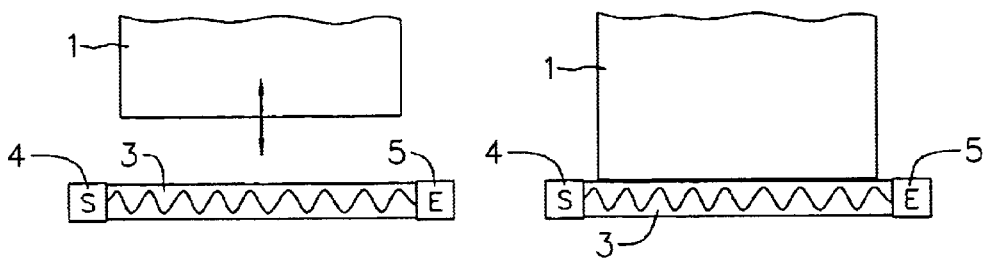
FIG.1a  FIG.1b
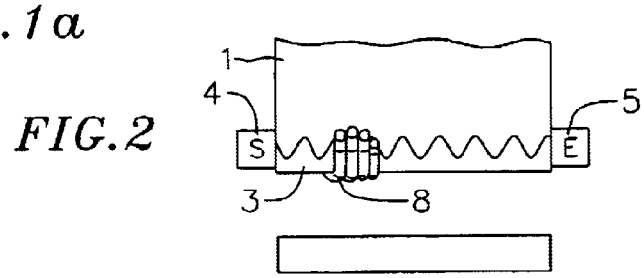
FIG.2
FIG.3a  FIG.3b
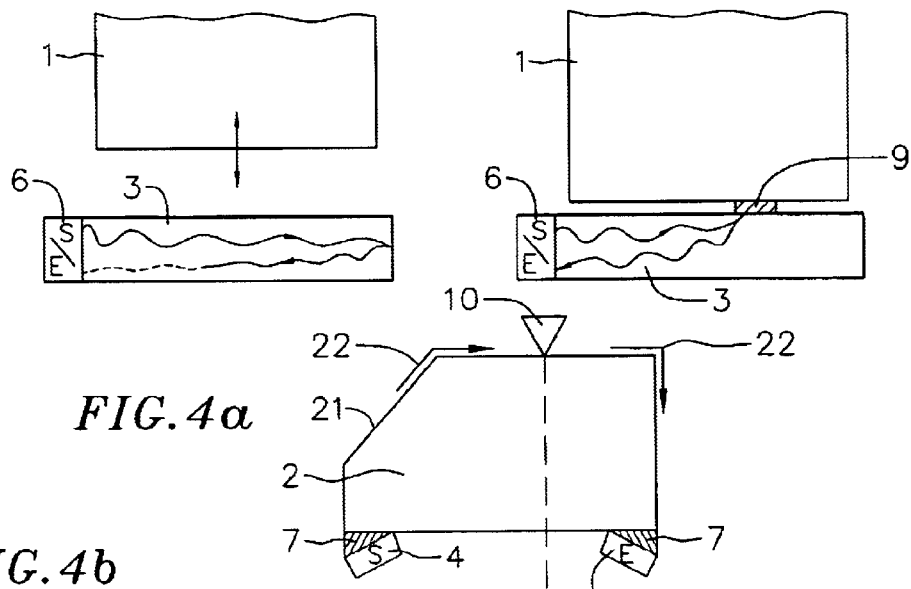
FIG.4a
FIG.4b
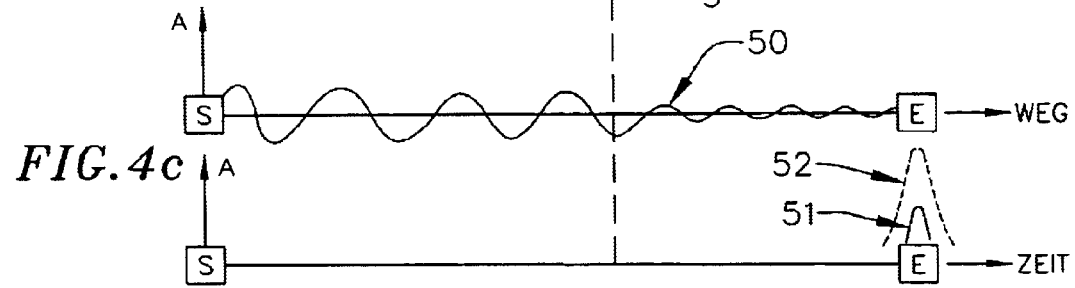
FIG.4c

OPENABLE AND CLOSABLE MOTOR VEHICLE WINDOW

CROSS-REFERENCE TO RELATED APPLICATION

This is a continuation of application Ser. No. 08/060,906, filed May 12, 1993, now abandoned.

BACKGROUND OF THE INVENTION

1. Field of the Invention

The invention relates to a device for restricting or controlling and regulating the movement of remote-controlled parts of a vehicle bodywork as disclosed herebelow. Particularly advantageous is its use as collision protection for window winders, sunroofs, doors or flaps.

2. Background Information

Devices for controlling and more particularly monitoring the closing process of motorized parts, such as doors, flaps or window panes of motor vehicles are known and use the most varied of technical principles for this purpose. A difference is made here between those which are linked with direct bodily contact and those systems which operate fee of contact.

In German Laid Open Patent Application No. 22 46 337 a safety device for motor closable openings is disclosed which measures a specific value of an acoustic source eg. the sound intensity wherein the acoustic receiver is connected to the acoustic source by a transmission path conducting the air-borne sound. The transmission path can be an elastic hose mounted in the area of a closing edge. When it is deformed through an obstruction the sound intensity reaching the received is reduced. An evaluator device reacts thereto with a setting command to the motor.

The disadvantage of this safety device is the danger of damage to or destruction of the transmission path when it is used as a jamming protection for the window winder of a vehicle.

Furthermore fixing the hose on the circumferential edge of the pane leads to fastening problems, in the area of the right-angled pane edges to transmission problems. Furthermore inside the guide frame there is the danger of unintended release of the safety device.

German Patent Publication Published for Opposition Purposes Number 24 32 063 describes a device for monitoring the door closing process in local transport vehicles by using the principle of a light beam. Radiation source and sensor are mounted substantially in one plane in the area of the closing edge. The transmission path inside the relatively large volumed elastic cover element is completed by a reflector at the opposite end of the closing edge. During deformation of the cover element the light transmission is dampened which leads via the sensor to the proposed reaction of the device.

A disadvantage is that the described device cannot or only after fitting expensive internal reflectors be used for monitoring curved closing edges as would be necessary for the window pane of a vehicle.

From German Patent Number 27 19 955 is known a contact-free field sensor for detecting persons or objects in front of edges>moving along a straight line. The antenna capacitors of the sensor detect an asymmetrical capacity change through approaching objects and lead to control commands via an evaluator device.

Unfortunately field sensors often do not have a sufficiently restricted (narrow) operating range so that reactions can also be triggered by objects which do not lie directly in the direction of movement of the closing edge. By way of example when using this safety system as jamming protection for electric window winders in motor vehicles the approach of the head or shoulder of a passenger towards the pane can lead to a reverse movement thereof.

German Patent Numbers 30 34 118 and 31 36 746 describe a process for electronically monitoring the opening and closing process of electrically operated assemblies wherein an electric setting member can be controlled from the time changes in the characteristic values of the assembly and their evaluation in a micro-computer. In one of the closing areas divided into several sections, during the closing process the speed of the assembly is continuously detected and compared with a boundary value. If the boundary value is exceeded then a temporary reverse movement is carried out followed by a complete switch-off.

This process very reliably detects jamming but as a result of the in part considerable mass inertia forces acting during the movement or braking of the displaceable object, the system reacts relatively sluggishly. Therefore quite large forces can act on the jammed objects.

OBJECT OF THE INVENTION

The object of the invention is to develop a device which is also suitable inter alia for use as a separate or additional collision protection wherein the release force is to be significantly reduced and wherein the collision protection should only respond in the area of immediate danger;

whose functional reliability is not impaired by outside influences such as dirt, water, ice, wear and ageing of the parts;

which manages without using separate switches mounted locally separated from the remote-controlled part; and which increases the operating comfort, more particularly by linking ergonomic and logical operating sequences.

SUMMARY OF THE INVENTION

According to the invention this is achieved through a device with at least one electromechanical converter as actuator and at least one mechanical-electrical converter as sensor, as well as an electronic evaluator/control device wherein the actuator and sensor are mounted on a common i.e. cohesive acoustic transmission path which is part of a remote-controlled part eg. a window pane or a tailgate of a motor vehicle, and which is particularly accessible to or can be brought into contact with a person, his hands or even inanimate objects. The actuator produces in the transmission path acoustic surface wavers (Rayleigh waves) of which the sensor detects at least one characteristic value eg. the amplitude or frequency and passes it on to the evaluator/control unit.

By altering the properties of the transmission path it may be necessary to adapt the device according to the invention. Depending on the pane guide and pane position the changed external conditions can lead to damping of the signal as a result of damage, dirt or ice and also to reflection of the signal. According to the invention the adjustment is achieved by increasing and reducing the output capacity and/or frequency of the actuator. In order to minimize the technical expense the actuator and sensor are advantageously designed as one integral functional unit wherein their functions are set timewise in succession. Piezo-crystals are suitable for this purpose.

However the use of several actuators and sensors can also be suitable. This makes it possible to diagnose the ageing of the transmission path or of the parts connected therewith (eg. the guide or sealing areas of a window pane or a flap of a vehicle) or even a temporarily altered state eg. through ice. The sensitivity of the system can easily be adapted to the new external conditions. This advantageously happens automatically by means of an electronics unit.

The application of one (or where necessary more) defined changeable areas on the transmission path which in itself is free of undesired changeable areas can be advantageous in order to increase the system sensitivity. The changeable area alters the spreading characteristic of the surface waves in a predetermined measure and thus serves as the reference point on the transmission path.

Various types of unstable areas can be used. As a rapid expansion or restriction of the transmission path orthogonally to the scattering direction of the surface wave they suddenly change the absorption degree or the reflection behavior. Further variations are inward or outward kinks, waves or edges in the transmission path. The radius of the unstable areas lies in the order of the wave length of the first harmonic surface wave and is as a rule much smaller than this itself.

If the transmission path is formed by a glass surface, eg. the circumferential end face of a window pane, then notches are particularly good for influencing the surface waves. Their shape can be adapted very well to the desired effects. Thus their shape and depth can have an influence on the ratio of the reflection part to the absorption part. Also the production of a diode effect, wherein the surface wave can pass the notch with only a slight damping in one direction whilst the surface wave in the other running direction as a result of a (quasi) total reflection is prevented from travelling on the other side of the notch.

For a direction-indifferent behavior, symmetrical notch geometries are used which have roughly the shape of an isosceles triangle. Asymmetrical notch geometries however lead to a ratio of reflection to absorption which is reversed in dependence on the direction. For example if a surface wave runs onto only a slightly inclined wedge surface (at a flat acute angle to the plane of the transmission path) then in each case a further transmission of the surface wave takes place in the original direction. Its amplitude is naturally reduced corresponding to the damping and reflection behaviour of the edge.

If the surface wave however strikes a wedge surface which is set up at a steep angle and includes with the transmission direction an angle of about 90 deg. or more, then with a simultaneously sufficient notch depth it results in total reflection. On the other hand a surface wave of the other scattering direction can pass the notch (diode effect).

The use of such notches makes it possible to increase the sensitivity of the measuring system when a part of the transmission path does not belong to the monitoring area, but external conditions can considerably influence its transmission properties. An example of this is the vertically aligned sealing and guide area of a vehicle window pane whose absorption properties can vary considerably in dependence on the position of the window pane, the tension of the pane and numerous environmental factors. The possibility of cutting out or evaluating these areas separately is often of decisive importance for a reliable monitoring of the freely accessible upper edge of the pane. A considerable increase in the sensitivity is achieved through the difference formation of the signals of different areas defined by notches. In order to increase and adapt the measuring and evaluating system further, a calibration path can be provided between the upper and lower stop position by applying a learning program.

An evaluation of the sealing and guide areas can also be used to control the drive output in order to ensure constantly uniform kinematics. The use of two transmitter/receiver units which are each preferably designed as integral piezoceramic vibrators leads to a redundantly operating device. Comparing the independently evaluated measuring results increases the reliability of the statement. More particularly, with an overall symmetrically designed device, the two measuring systems can also operate in cold operating redundancy.

An advantageous application of the device according to the invention is its use as collision protection for electrically operated window winders, sunroofs, doors or flaps. The transmission properties change when a colliding object contacts the transmission path. The sensor and control unit registers this and causes corresponding setting commands. A complete or partial reversing of the displacement movement (in the case of window winders), or jamming in the position reached can be obtained.

Further uses can exist in the control of the end and intermediate positions of a displacement part. It is thus possible for example to "soft" start the upper and lower end position or to control short-stroke lowering of the side pane which facilitate the closing of doors. Furthermore the function principle of the invention can dispense with the use of switches because the mere contact of one or more proposed areas in the transmission path triggers the desired switching effects.

When using the device according to the invention for a collision protection those faces which can be influenced from outside and which substantially represent the closing faces are suitable as the transmission path. Their plane runs mostly at an angle to the direction of movement of the remote-controlled component. If this component is for example a window pane of a vehicle then the circumferential end face which connects the outer and inner pane plane is used as the transmission face. The actuator and sensor or a corresponding function unit can advantageously be mounted on a component of the transmission path which is not directly accessible, which cannot be seen directly and which does not destroy the path of movement of the window. The lower edge of the pane would be suitable for this. If, however, the actuator and/or sensor are to be used in the area of the closing faces (e.g. upper edge of the pane) then the energy and signal leads are provided on the edge of the disc in the form of printed conductor plates.

Coupling and uncoupling the energy is carried out either by conductor plates or cables or wireless (e.g. inductively) when the required energy density and reliability of the structural elements permit this.

One or more of the following principles can be used to evaluate the signal: running time measurement, amplitude modulation, phase and frequency modulation. The requirements for reliability (also redundancy) and sensitivity are decisive for this.

BRIEF DESCRIPTION OF THE DRAWINGS

The invention will now be explained in further detail with reference to an embodiment shown in the drawings in which:

FIG. 1*ab* shows an automobile door, as viewed from within the automobile, with a power window;

FIG. 1*a* is a diagrammatic illustration of the device according to the invention for a closable opening with a transmitter and receiver at the ends of the transmission path (in the opened position);

FIG. 1*b* as FIG. 1*a* (in the closed position);

FIG. 2 is a diagrammatic illustration of the device according to the invention for a closable opening with a transmission path mounted in the movable part;

FIG. 3*a* is a diagrammatic illustration of the device according to the invention for a closable opening with sensor and receiver mounted solely at one end of the transmission path (in the opened position);

FIG. 3*b* is a diagrammatic illustration of the device according to the invention for a closable opening with jammed-in object (in a practically closed position);

FIG. 4*a*' is essentially the same view as FIG. 4*a*, with additional components;

FIG. 4*b* is a qualitative illustration of the path of the amplitude over the path (transmission path) (according to FIG. 4*a*);

FIG. 4*c* is a qualitative illustration of the path of the amplitude over the time (according to FIG. 4*a*);

DESCRIPTION OF THE PREFERRED EMBODIMENTS

Figure 1A:
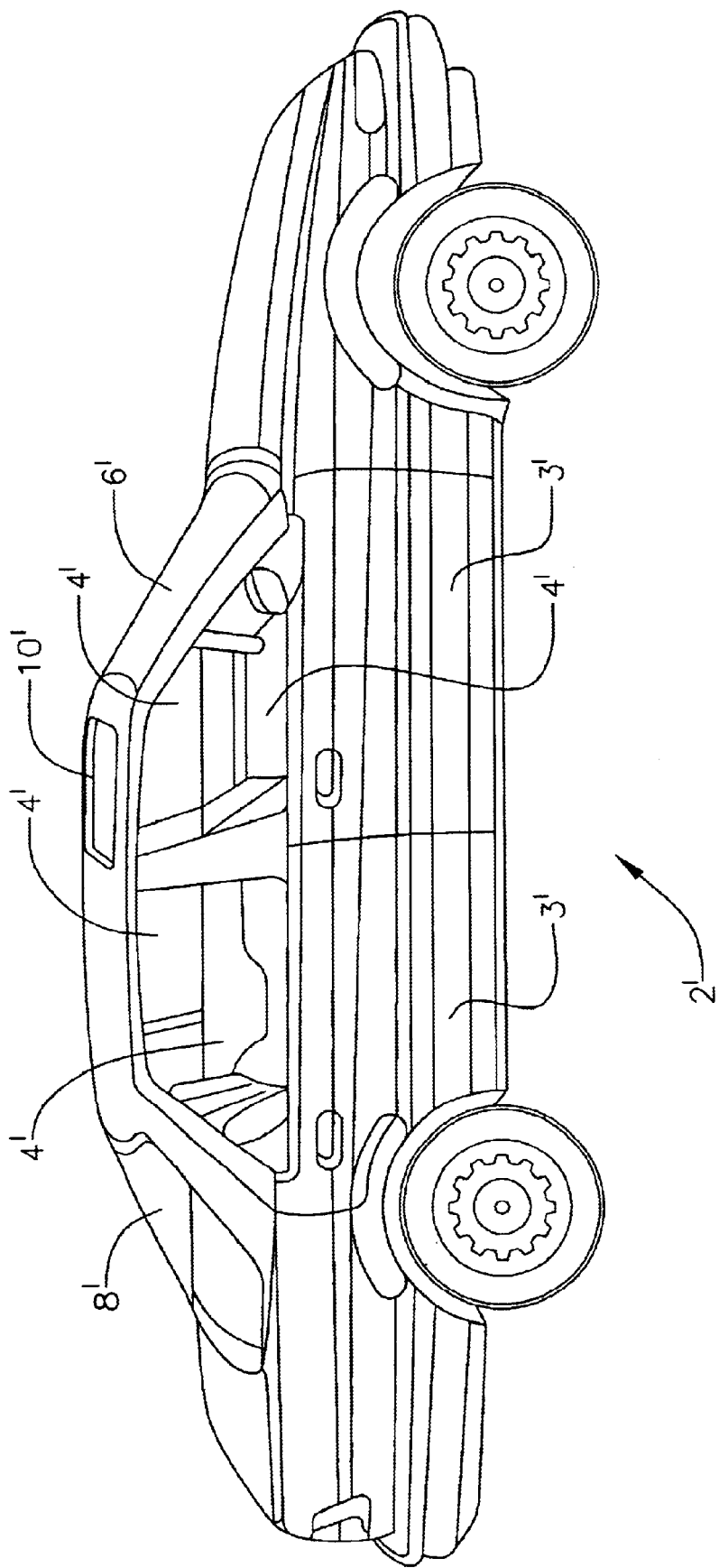
FIG. 1*aa* shows an automobile having several openable and closable windows.
Figure 1A:
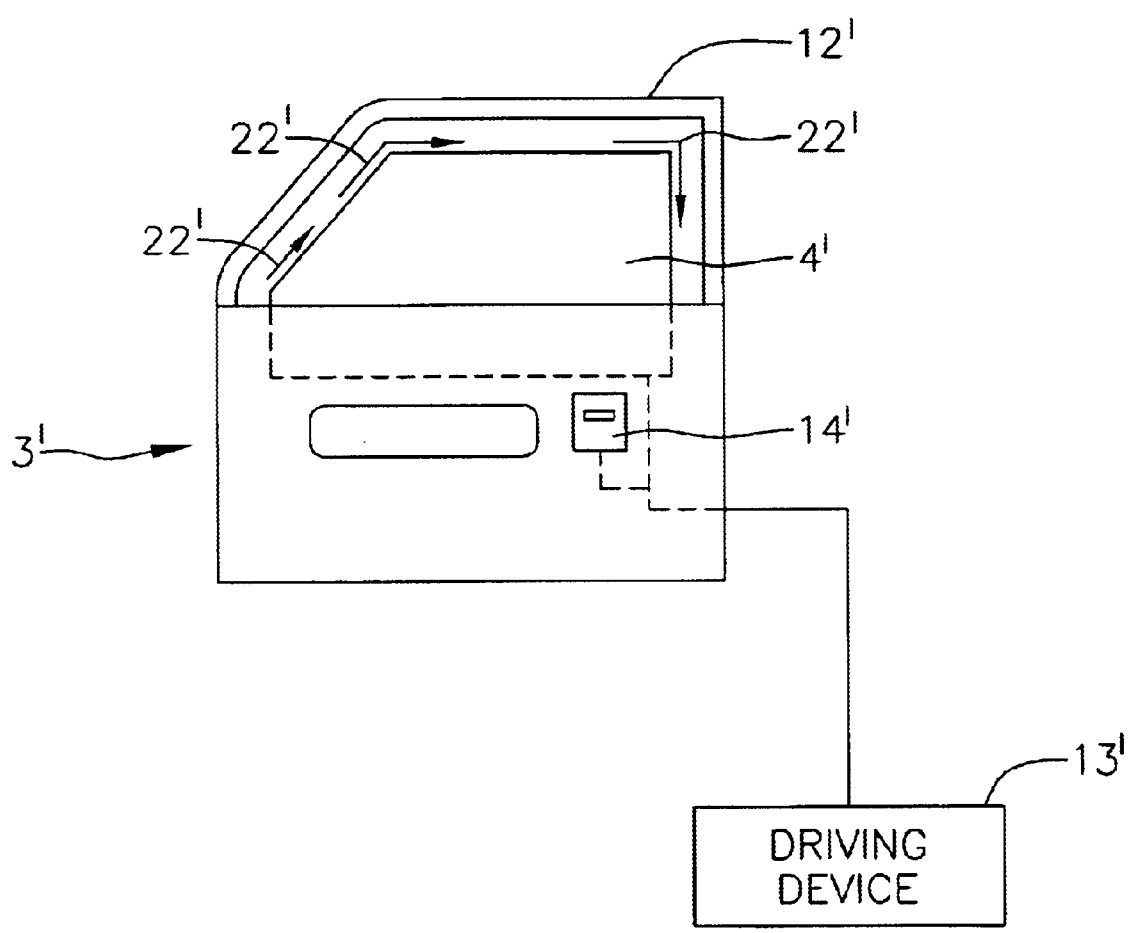

FIG. 1*aa* illustrates an automobile 2', in which the present invention may be utilized. The automobile 2' includes doors 3' with a corresponding set of openable and closable windows 4', as well as front windshield 6' and rear windshield 8'. Additionally, automobile 2' may include a sunroof or other slidable overhead panel 10'. The illustrated automobile 2' includes four openable and closable windows 4'. The present invention may preferably be employed in an openable and closable window 4', as shown, in an automobile 2' or other motor vehicle.

FIG. 1*ab* illustrates an automobile door 3', as viewed from inside the automobile, with a power window. Window 4' is shown in an intermediately raised position within frame 12'. Window 4' is power driven by means of an appropriate driving device 13', which in turn may preferably be actuated by a suitable switch 14'. Arrows 22' indicate the path of propagation of acoustic surface waves along what may be considered to be the receptacle area of frame 12', that is, the area of frame 12' that receives the edge of window 4'.

Generally, the invention utilizes the ability of a solid body to pass on induced mechanical waves on its surface as so-called surface waves along a design-conditioned or extra scattering path and under the effect of external influences to react with damping and/or reflection of the surface waves. Sensors send the measuring pulses onto an evaluator unit where the system state is considered from an algorithm and in turn becomes the basis for reactions,'setting commands or the like.

Although the embodiments substantially relate to the use of the device according to the invention as jamming protection for an electric window winder for a motor vehicle, its subject also extends to other controllable or adjustable systems for which surface waves are used and evaluated in analogous way and which use corresponding suitable transmission paths in the area of the closing edges or closing faces of the objects which are moved towards each other.

FIGS. 1*a* and 1*b* show diagrammatically, in simplified manner, the device according to the invention for a closable opening which supports a transmitter 4 and a receiver 5 at the ends of a locally fixed transmission path 3. A movable part 1 is shown at a distance from this. The device is located in the opened position. An electro-mechanical converter at one end of the transmission path 3 couples energy which in one part is converted into surface waves and transported to the other end of the transmission path 3 where the receiver 5 receives the signals. Depending on the material and geometry of the transmission path 3 a certain signal damping occurs. In the closed state (c.f. FIG. 1*b*), thus on reaching the end position of the movable part 1, the closing faces contact one another over a large surface area and uncouple a large part of the vibration energy. The signal damping which is quite considerably increased thereby is registered by the receiver 5 and leads to detection of the end position in the evaluator unit.

FIG. 2 illustrates a device which has a quite similar construction but with the difference that the transmission path 3 is mounted in the lower area of the movable part 1. The sensor 3 and actuator 5 are located at the ends thereof. Although the movable part has not yet reached its end position the sensor 4 registers a severely damped signal as a result of the energy being uncoupled through a hand 8 engaging in the transmission path 3.

According to FIGS. 3*a* and 3*b* the transmitter and receiver are mounted in the form of one function unit 6 at one and the same end of the transmission path 3. The function unit is made in one piece wherein it then acts alternately as an actuator and a sensor. Piezo-ceramic structural elements can be successfully used for this purpose. The end of the transmission path 3 is designed so that as far as possible all the energy is absorbed and thus the sensor can no longer receive any signals. When coupling an object 9 into the transmission path 3 for example by jamming, the scattering of the waves alters through reflection at the jamming point. The reflected signal passes to the receiver and represents the basis for the detection of the jamming state.

Figure 4A:
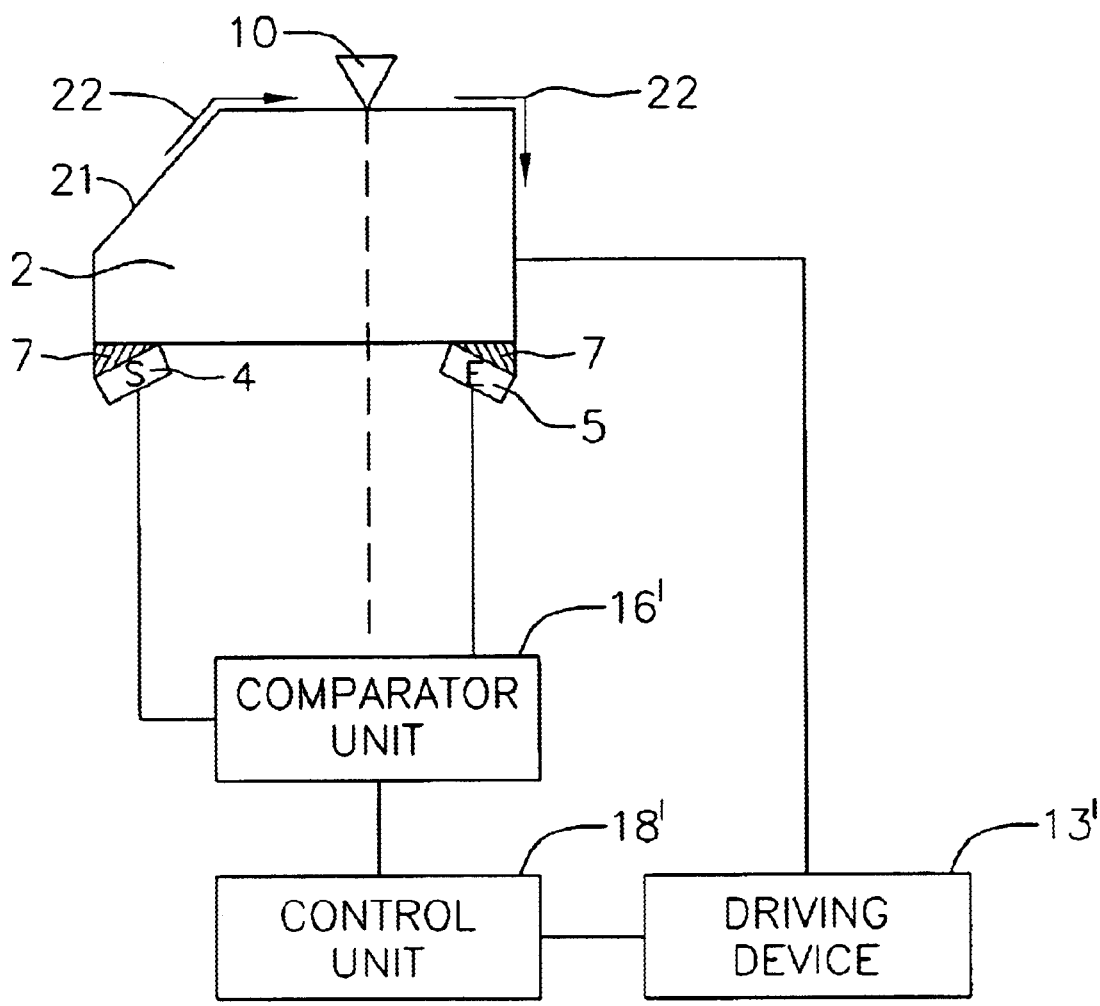
FIG. 4*a* is a diagrammatic illustration of a window pane of a motor vehicle with separate transmitter and receiver mounted on the lower edge of the disc, and an object acting on the upper edge.

One application of the invention for an electric window winder of a motor vehicle is shown diagrammatically in FIG. 4*a*. A transmitter 4 and receiver 5 are each mounted separately at the side edges of the lower edge of the window pane 2. They are coupled by a wedge 7 into the transmission path of the window pane, which path is formed by a surface region of the circumferential face portion of the window pane edge 21, termed herein "the edge," and which is provided for passing on the surface waves. A preferred direction for the wave scattering or wave reception is thereby achieved. Advantageously the entire width of the transmission path is covered by the transmitter 4 and receiver 5. The arrows 22 lying near the pane edge 21 indicate the scattering direction of the surface waves. In the area of the upper edge of the pane an object 10 or part of the body in contact or acoustically coupled to same is shown symbolically in the form of a triangle. The vibration energy uncoupled through this object signifies an additional damping and reduces the amplitude of the surface waves as well as the intensity of the signal 50 received at the receiver 5.

As shown in FIG. 4a', a motor vehicle window according to the present invention may preferably include a comparator unit 16' connected to transmitter 4 and receiver 5. Preferably, comparator unit 16' is configured to compare selected wave characteristics of the acoustic surface waves both propagated by transmitter 4 and detected by receiver 5. Also, comparator unit 16' may preferably include, for example, an amplitude signal threshold or other type of threshold.

Comparator unit 16' is preferably connected to a control unit 18' for window pane 2. Control unit 18' is preferably configured to alter the displacement of window pane 2 in response to signals transmitted from comparator unit 16' and, as such, is preferably connected to driving device 13'. For example, if an object 10 becomes lodged between window pane 2 and the window frame (not shown), the acoustic surface waves detected by receiver 5 will, essentially, preferably have such an amplitude, or other wave characteristic, that an amplitude threshold, or other threshold, is breached. Upon breaching of the amplitude, or other, threshold, a signal is preferably sent from comparator unit 16' to control unit 18' to cause the control unit 18' to control the driving device 13' in such a way as to cease movement of window pane 2. Comparator units and control units are well known in the art and will not be further discussed here.

FIG. 4b shows qualitatively the path of the amplitude over the transmission path (pane edge 21). The qualitative illustration analogous with this of the path of the amplitude over the time is shown in FIG. 4c. According to this, when coupling a foreign body into the transmission path at the receiver 5 a signal 51 is to be expected whose amplitude is considerably reduced compared to that of the signal 52.

Preferably, each wedge 7 is configured, and oriented, such that the acoustic surface waves produced by transmitter 4 are appropriately focused and directed to ensure that the waves travel about transmission path 22 and are appropriately received by receiver 5.

Figure 5A:
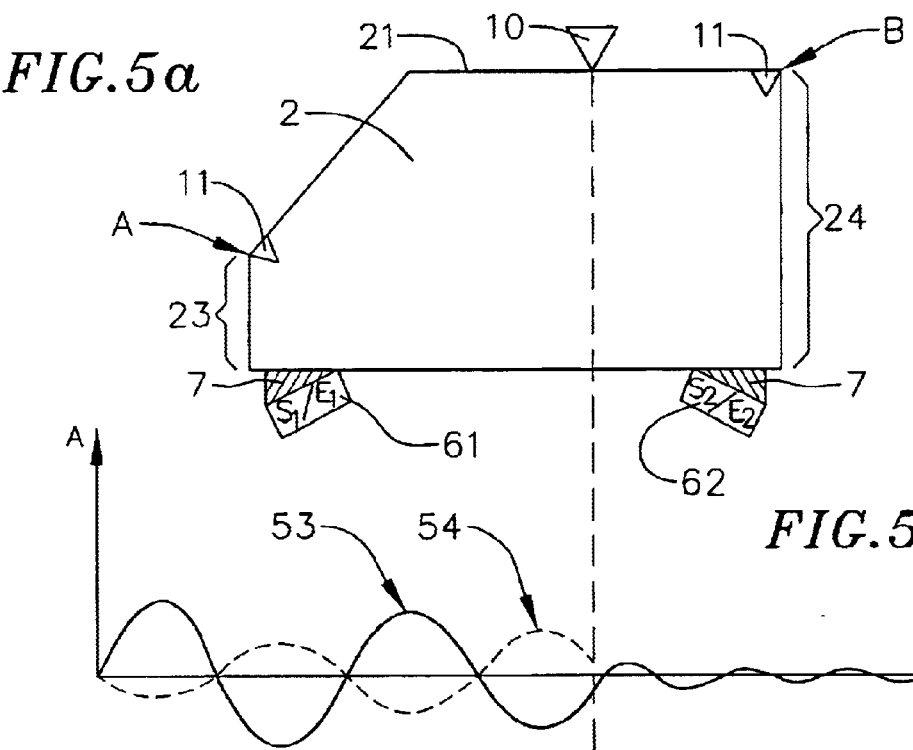
FIG. 5*a* is a diagrammatic illustration of a window pane of a motor vehicle with transmitter/receiver units mounted on the lower edge of the pane and each producing surface waves with opposite scattering direction wherein the upper edge of the pane is contacted by an obstruction.

The diagrammatic illustration of a window pane 2 of a motor vehicle according to FIG. 5a shows the following differences compared to the variation illustrated in FIG. 4a:

The mechanical-electrical converters 6 coupled onto the edges of the lower pane edge each function both as a transmitter and receiver. Furthermore the acoustic transmission path formed by the circumferential pane edge 21 supports two symmetrical and identical notches 11 whose radii are smaller than the wave length of the first harmonic surface wave so that influence can be brought to bear on the scattering of the waves. The arrangement of the notches 11 in the transmission path is preferably selected so that they precisely enclose the freely accessible upper pane edge in whose area jamming can occur, and separate from the adjoining parallel guide areas 23,24 on each side. The selected notch geometry causes both reflection and damping effects. With the aid of this the guide areas 23,24 of the window pane 2 can not only be cut out but also their damping properties can be separately evaluated. These in turn can be used to control the transmitting output of the OFW transmitter in order to have a constant SIN ratio.

In accordance with the present invention, a notch 11 may preferably be embodied by a small notch in window pane 2 or by another appropriate type of discontinuity. Other types of discontinuities appropriate for notch 11 may include: a groove etched in window pane 2, an inward bend of the material of window pane 2, or an outward bend of the material of window pane 2.

Figure 5B:
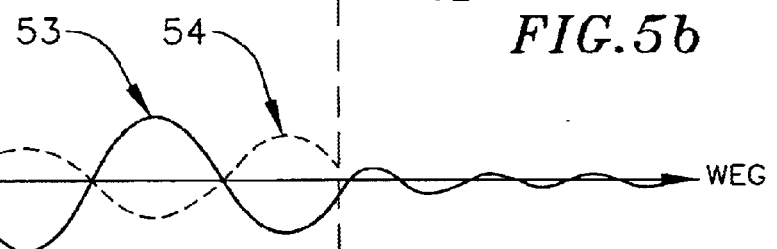
FIG. 5*b* is a qualitative illustration of the amplitude of a reflected and a damped surface wave according to FIG. 5*a*.
Figure 5C:
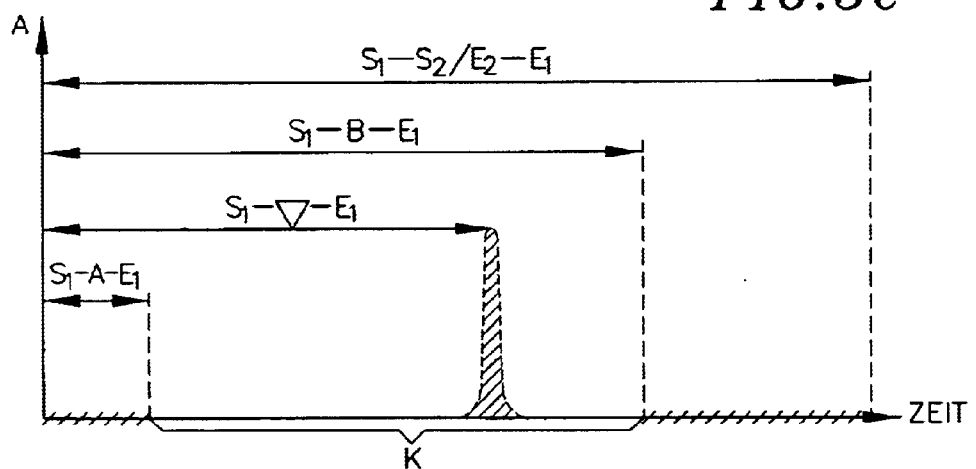
FIGS. 5*c* and 5*d* are diagrammatic division illustrations of the transmission paths according to FIG. 5*a* wherein on the one hand the signal starts from the first transmitter/receiver unit and on the other hand starts from the second transmitter/receiver unit.
Figure 5D:
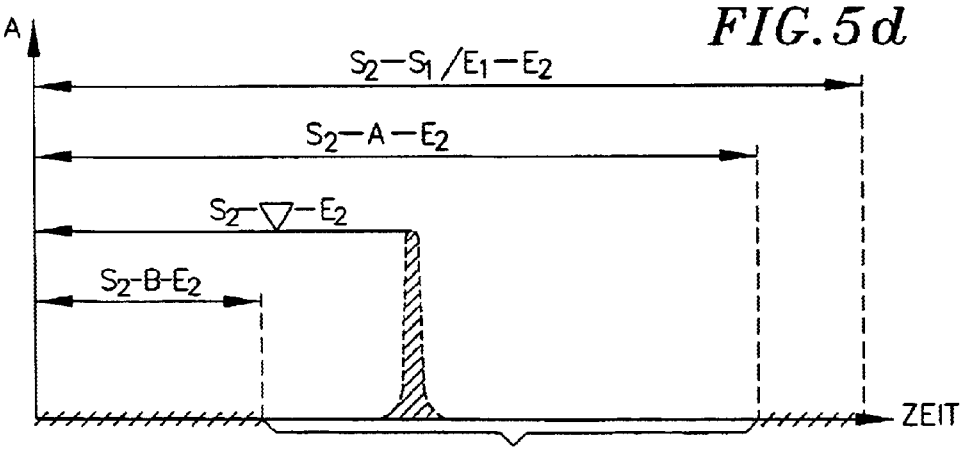

The following FIGS. 5b, 5c and 5d show in simplified manner the amplitude of a surface wave over the path or time without however taking into account reflection effects at the notches 11. In the fore are the effects caused here through an object owing the jamming between the upper edge of the pane and the door frame.

The said object 10 will in each case cause damping of the amplitude of the signal 53 emitted by the first transmitter/receiver unit 61 (FIG. 5b), which is registered by the second transmitter/receiver unit 62. This is particularly the case when for example the hand of a person is jammed in which owing to its relative softness and thus good acoustic coupling can cause hardly any noticeable reflection part of the surface wave. In the event however of a relatively hard foreign body becoming coupled into the transmission path 21 of the freely accessible upper edge of the window pane 2, then, an additional reflection signal 54 can be registered by the first transmitter/receiver unit 61 and, thus, the ability of the device to provide information can be improved through redundancy.

FIGS. 5c and 5d divide up the transmission path diagrammatically wherein on one hand it starts from the first transmitter/receiver unit 61 and on the other it starts from the second transmitter/receiver unit 62. Whilst it is possible to cut out the guide area 23,24 initially passed by the surface wave solely on the basis of the running time measurement, the guide area 23,24 of this surface wave next passed though can only be cut out if the signal reflected at the second notch 11 comes up for evaluation. The same applies for the signals sent out by the other transmitter/receiver unit. Although the notches 11 lead to a considerable damping of the signals its use can be very advantageous. Finally the cutting out of the guide areas 23,24 right and left of the window pane 2 permits an accurate and substantially fault-free amplification of the signals of the control area K which leads to a significant improvement in the message reliability.

In FIGS. 5c and 5d the following equations have the following meanings:

$S_1-S_2/E_2-E_1$ Running time of the signal from the first transmitter/receiver unit 61 to the second transmitter/receiver unit 62 and back.

$S_2-S_1/E_1-E_2$ As above, only in the reverse direction.

$S_1-B-E_1$ Running time of the signal from the first transmitter/receiver unit to the notch 11 at place B and back.

$S_1-\nabla-E_1$ Running time of the signal from the first transmitter/receiver unit up to the object 10 which is coupled into the transmission path 21, and back.

$S_2-\nabla-E_2$ Running time of the signal from the second transmitter/receiver unit up to the object 10 and back.

S₁–A–E₁ Running time of the signal from the first transmitter/receiver unit up to the notch at place A and back. (This guide area is ignored when evaluating a jamming or collision state.).

S₂–B–E₂ Running time of the signal from the second transmitter/receiver unit up to the notch at place B and back. (Also this guide area is ignored when evaluating a collision state).

The control area K is enclosed by the guide areas 23,24. It represents the part of the transmission path 21 which is freely accessible. Thus to detect a state of collision it is only necessary to evaluate such signal changes which have their origin within the running time of the control area K.

Figure 6:
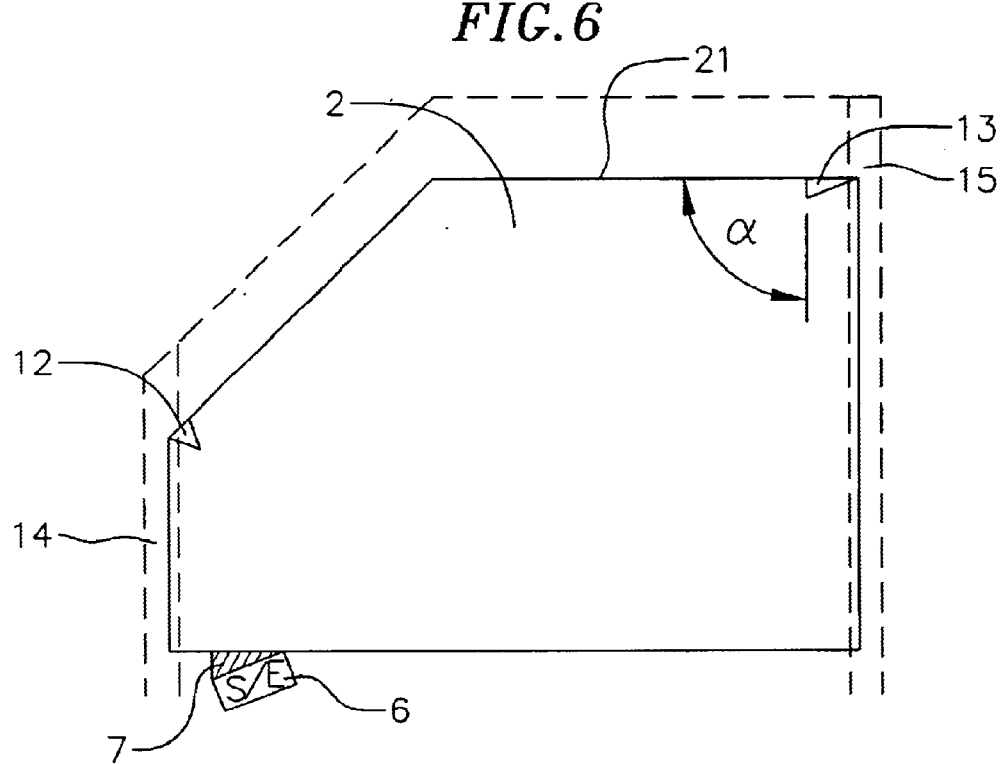
FIG. 6 is a diagrammatic illustration of a window pane of a vehicle with a transmitter/receiver unit mounted on the lower edge of the pane, and two differently formed notch geometries in the transmission path of the surface wave.

A variation of the invention is shown diagrammatically in FIG. 6. A transmitter/receiver unit 6 is mounted only on one of the edges of the lower pane of the disc and coupled by a wedge-shaped element 7 into the transmission path 21 of the surface waves.

Also here two notches 12,13 enclose the transmission path 21 in the upper area of the pane edge. Their geometries are however different and are the reason for a different reflection and damping behavior. Whereas the notch 12 lying closest to the transmitter/receiver unit 6 has a symmetrical construction and acts with the main transmission part as well as the damping and reflection part on the surface wave, the second asymmetrically designed notch causes a steep rising notch flank which includes with the upper pane edge an angle α of preferably about 90° and faces the scattering direction of the surface wave. In order to judge the system state only signals are evaluated which lie in the time interval between the first notch 12 and second notch 13 and which thus represent the area of the freely accessible transmission path of the upper edge of the disc. The evaluation unit will return a suddenly altered damping state to a clamping state and send on suitable control commands to the servo motor which advantageously results in the window pane 2 reversing. General conclusions on the properties inside the guide frame 14,15 can be achieved by evaluating the area between the transmitter/receiver unit 6 and the first notch 12. Calibrations between the stop positions makes it possible to draw conclusions on the general state in the sealing area and to bring about optimum adjustment of the sensitivity of the monitoring system. Such adjustment in particular makes it possible to eliminate changed external conditions in the transmission path which can be caused for example by ageing of the sealing material, by dirt or ice in the guide areas of the pane or even by material fatigue.

Figure 7:
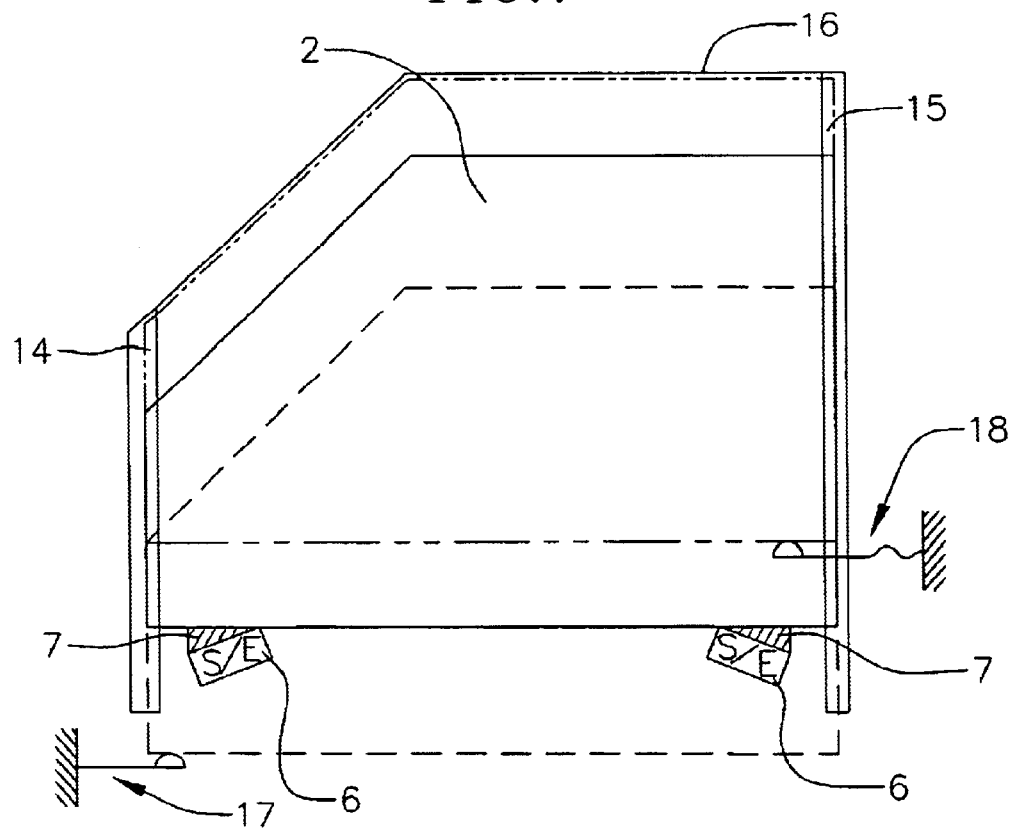
FIG. 7 is a diagrammatic illustration of a window pane in a guide frame with auxiliary means for detecting the end position through coupling into the transmission path of the surface wave.

FIG. 7 shows the diagrammatic illustration of a window pane 2 in a guide frame 14,15 with means 17,18 for detecting the end position. These means 17,18 are mechanically coupled into the transmission path of the surface waves in dependence on the pane position and by using spring-loaded elements, and lead to measurable variations in the signals arriving at the receiver 6. The coupling of the means 17,18 for detecting the lower stop and upper stop are at different points and are therefore very easy to distinguish through measuring technology. The advantage of detecting the end position is on the one hand that the lower stop can be "soft" started whereby a lighter less robust method of construction is possible. On the other hand the uppermost displacement or closing area (sealing area 16) is selected from the remaining displacement area in which jamming is no longer possible, and a compulsory retention of the displacement force is necessary for completely closing the window opening.

One feature of the invention resides broadly in the device for restricting and controlling and regulating the movement of remote-controlled parts, more particularly parts of a vehicle bodywork, such as for example a window pane or tailgate of a motor vehicle, by using at least one electromechanical converter as actuator and at least one mechanical-electrical converter as sensor, as well as an electronic unit for controlling or regulating the actuator, to evaluate the sensor signals and based thereon to control the drive unit characterised in that the actuator and sensor are mounted on a cohesive uninterrupted transmission path which is part of the closing surface area of the remote-controlled part and/or of the fixed part interacting therewith, so that a part of the energy given out by the actuator is converted into acoustic surface waves (Rayleigh waves) which can scatter over the transmission path and be received by the sensor.

Another feature of the invention resides broadly in the device, characterized in that an actuator regulated with regard to the amplitude is used to adapt to the given or altered outside conditions in the transmission path, caused for example by ageing, pollution, pane guide or otherwise.

Yet another feature of the invention resides broadly in the device, characterized in that the actuator and sensor are made in one piece in the function unit wherein the function unit which is preferably designed as a piezo-crystal functions alternately as an actuator and sensor.

Still another feature of the invention resides broadly in the device, characterized in that several actuator and/or sensors are mounted on the transmission path.

Still yet another feature of the invention resides broadly in the device, characterized in that the transmission path for the surface waves contain at least one unstable point which rapidly changes the scattering characteristic of the surface waves.

Yet still another feature of the invention resides broadly in the device, characterized in that the unstable point is designed as a sudden expansion or restriction orthogonally to the scattering direction, or as an inward or outward bend, or as a groove, notch, edge or the like in the scattering direction in the transmission path.

Another feature of the invention resides broadly in the device, characterized in that the radius of the unstable point located in the transmission path of the surface waves is much smaller than the wave length of the first harmonic surface wave.

Still another feature of the invention resides broadly in the device, characterized by its use for an end position break, eg. for the upper and/or lower stop of a window winder or for controlling eg short stroke drops.

Yet another feature of the invention resides broadly in the device, characterized by its use as collision protection for window winders, sunroofs, doors or flaps.

Still another feature of the invention resides broadly in the device, characterized in that the actuator and sensor are mounted on the transmission surface of the window pane which is not directly visible and accessible and are a constituent part of a jamming protection for electric window winders.

Yet still another feature of the invention resides broadly in the device, characterized in that the actuator and sensor are mounted on the closing face of the window pane and that their current supply is provided through conductor plates printed on the window pane.

Another feature of the invention resides broadly in the process for operating a device for restricting or controlling the movement of remote-controlled parts of a vehicle bodywork characterized in that the data is obtained by applying the principles of running time measurement, amplitude modulation, phase modulation and/or frequency modulation.

Yet another feature of the invention resides broadly in the process, characterized in that the evaluation is undertaken by reflection and transmission of the surface waves in parallel.

Examples of transducers, receivers, and combined transducers and receivers, which may be utilized in accordance with the embodiments of the present invention, may be found in the following U.S. Pat. No. 4,567,747, which issued to Matay on Feb. 4, 1986; U.S. Pat. No. 4,462,256, which issued to Moffett on Jul. 31, 1984; U.S. Pat. No. 3,999,147, which issued to Otto et al. on Dec. 21, 1976; U.S. Pat. No. 4,511,866, which issued to Milsom on Apr. 16, 1985; U.S. Pat. No. 4,060,833, which issued to Onyshkevych on Nov. 29, 1977.

Examples of learning programs may be found in the following U.S. Patents: U.S. Pat. No. 4,698,780, which issued to Mandel et al. on Oct. 6, 1987; U.S. Pat. No. 4,287,506, which issued to Richards on Sep. 1, 1981; and U.S. Pat. No. 4,224,690, which issued to Rockwell on Sep. 23, 1983.

Examples of piezo-crystal, or piezo-ceramic elements, which may be utilized in accordance with the embodiments of the present invention, may be found in the following U.S. Patents: U.S. Pat. Reissue No. 33,691 to Harnden et al., which issued on Sep. 17, 1991; U.S. Pat. No. 4,862,030, which issued to Yokoyama on Aug. 29, 1989; and U.S. Pat. No. 4,669,160, which issued to Harnden et al. on Jun. 2, 1987.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A method of opening and closing a motor vehicle window and avoiding injury to a human body part, said method comprising the steps of:

providing a frame;

providing a window pane for being movably disposed within said frame, said window pane having a leading edge;

configuring said frame to have a receptacle area for accommodating said leading edge of said window pane;

configuring said window pane to be positionable between a first, closed position, wherein said leading edge of said window pane is in contact with said receptacle area of said frame, and a second, maximally open position; wherein said leading edge of said window pane is maximally retracted from said receptacle area of said frame;

providing means for displacing said window pane between said first position and said second position;

providing control means for controlling said displacing means;

providing actuator means for generating acoustic surface waves and for propagating the acoustic surface waves along at least one surface of said frame and said window pane;

coupling said actuator means to at least one surface of said frame and said window pane;

providing sensor means for detecting the propagated acoustic surface waves;

configuring said actuator means to comprise means for propagating the acoustic surface waves along at least one of:

said leading edge of said window pane; and said receptacle area of said frame;

providing comparator means for comparing at least one characteristic of the propagated acoustic surface waves and the detected acoustic surface waves and determining a difference, in terms of at least one wave characteristic, between the propagated acoustic surface waves and the detected acoustic surface waves;

providing means for establishing a threshold, in terms of at least one wave characteristic, for the detected acoustic surface waves; and configuring said control means to comprise means for altering the displacement of said window pane upon breaching of the threshold by the detected acoustic surface waves;

said method additionally comprising the further steps of:

displacing said window pane between said first position and said second position;

generating acoustic surface waves and propagating the acoustic surface waves along at least one surface of said frame and said window pane;

detecting the propagated acoustic surface waves;

said step of propagating comprising propagating the acoustic surface waves along at least one of:

said leading edge of said window pane; and said receptacle area of said frame;

establishing a threshold, in terms of at least one wave characteristic, for the detected acoustic surface waves;

upon contact of a human body part with said leading edge of said window pane:

comparing at least one characteristic of the propagated acoustic surface waves and the detected acoustic surface waves and determining a difference, in terms of at least one wave characteristic, between the propogated acoustic surface waves and the detected acoustic surface waves; and altering the displacement of said window pane upon breaching of the threshold by the detected acoustic surface waves.

2. The method according to claim 1, further comprising the step of:

said step of altering the displacement of said window pane comprising stopping the displacement of said window pane upon breaching of the threshold by the detected acoustic surface waves.

3. The method according to claim 2, further comprising the steps of:

mounting said actuator means and said sensor means to propogate the acoustic surface waves and detect the acoustic surface waves, respectively, on an uninterrupted transmission path.

4. The method according to claim 3, further comprising the steps of:
providing means for calibrating said actuator means in response to external influences on the propagation and detection of said acoustic surface waves; and
calibrating said actuator means in response to external influences on the propagation and detection of said acoustic surface waves.

5. The method according to claim 4, further comprising the step of:
configuring said comparator means to comprise means for comparing an amplitude of the propagated acoustic surface waves with an amplitude of the detected acoustic surface waves.

6. The method according to claim 5, further comprising the step of:
configuring the motor vehicle window such that:
said means for establishing a threshold comprises means for establishing an amplitude threshold; and
said control means comprises means for altering the displacement of said window pane upon breaching of the amplitude threshold by the detected acoustic surface waves.

7. The method according to claim 4, further comprising the steps of:
configuring the motor vehicle window such that:
said comparator means comprises means for comparing the propagated acoustic surface waves and the detected acoustic surface waves by means of at least one of:
running time measurement, amplitude modulation, phase modulation and frequency modulation; and
said comparator means comprises means for comparing the propagated acoustic surface waves and the detected acoustic surface waves through transmission and reflection of the acoustic surface waves in parallel.

8. An openable and closable motor vehicle window comprising:
a frame;
a window pane being movably disposed within said frame;
said window pane having a leading edge;
said frame having a receptacle area for accommodating said leading edge of said window pane;
said window pane being positionable between a first, closed position, wherein said leading edge of said window pane is in contact with said receptacle area of said frame, and a second, maximally open position, wherein said leading edge of said window pane is maximally retracted from said receptacle area of said frame;
means for displacing said window pane between said first position and said second position;
control means for controlling said displacing means;
actuator means coupled to at least one surface of said frame and said window pane for generating acoustic surface waves and for propagating the acoustic surface waves along at least one surface of said frame and said window pane;
sensor means for detecting the propagated acoustic surface waves;
said actuator means comprising means for propagating the acoustic surface waves along at least one of:
said leading edge of said window pane; and
said receptacle area of said frame;
comparator means for comparing at least one characteristic of the propagated acoustic surface waves and the detected acoustic surface waves and determining a difference, in terms of at least one wave characteristic, between the propagated acoustic surface waves and the detected acoustic surface waves;
means for establishing a threshold, in terms of at least one wave characteristic, for the detected acoustic surface waves; and
said control means comprising means for altering the displacement of said window pane upon breaching of the threshold by the detected acoustic surface waves.

9. The motor vehicle window according to claim 8, wherein said actuator means and said sensor means are mounted to propagate the acoustic surface waves and detect the acoustic surface waves, respectively, on an uninterrupted transmission path.

10. The motor vehicle window according to claim 9, further comprising means for calibrating said actuator means in response to external influences on the propagation and detection of said acoustic surface waves.

11. The motor vehicle window according to claim 10, wherein said comparator means comprise means for comparing an amplitude of the propogated acoustic surface waves with an amplitude of the detected acoustic surface waves.

12. The motor vehicle window according to claim 11, wherein:
said means for establishing a threshold comprises means for establishing an amplitude threshold; and
said control means comprises means for altering the displacement of said window pane upon breaching of the amplitude threshold by the detected acoustic surface waves.

13. A method of opening and closing a motor vehicle window and avoiding injury to a human body part, said method comprising the steps of:
providing a frame;
providing a window pane for being movably disposed within said frame, said window pane having a leading edge; configuring said frame to have a receptacle area for accommodating said leading edge of said window pane; configuring said window pane to be positionable between a first, closed position, wherein said leading edge of said window pane is in contact with said receptacle area of said flame, and a second, maximally open position, wherein said leading edge of said window pane is maximally retracted from said receptacle area of said frame;
providing means for displacing said window pane between said first position and said second position;
providing control means for controlling said displacing means;
providing actuator means for generating acoustic surface waves and for propagating the acoustic surface waves along at least one surface of said frame and said window pane, said actuator means coupled to at least one surface of said frame and said window pane, said actuator means configured to comprise means for propagating the acoustic surface waves along at least one of said leading edge of said window pane and said receptacle area of said frame;
providing means for calibrating said actuator means in response to external influences on the propagation and detection of said acoustic surface waves;

calibrating said actuator means in response to external influences on the propagation and detection of said acoustic surface waves;

providing sensor means for detecting the propagated surface acoustic waves, wherein said actuator means and said sensor means are combined in a single piezo-crystal component;

providing comparator means for comparing at least one characteristic of the propagated acoustic surface waves and the detected acoustic surface waves, the comparator means determining a difference in terms of at least one wave characteristic between the propagated and the detected acoustic surface waves;

providing means for establishing a threshold in terms of at least one wave characteristic for the detected acoustic surface waves; and configuring said control means to comprise means for altering the displacement of said window pane upon breaching of the threshold by the detected acoustic surface waves;

said method additionally comprising the steps of:

displacing said window pane between said first position and said second position;

generating acoustic surface waves and propagating the acoustic surface waves along an uninterrupted transmission path, said step of propagating comprising propagating the acoustic surface waves along at least one of said leading edge of said window frame and said receptacle area of said frame;

detecting the propagated acoustic surface waves;

establishing a threshold in terms of at least one wave characteristic for the detected acoustic surface waves;

comparing at least one characteristic of the propagated acoustic surface waves and the detected acoustic surface waves to thereby determine a difference in terms of at least one wave characteristic between the propagated and the detected acoustic surface waves;

stopping the displacement of said window pane upon breaching of the threshold by the detected acoustic surface waves.

14. The method according to claim 13, further comprising the step of configuring the motor vehicle window such that:

said actuator means comprise a plurality of actuators mounted along the transmission path;

said sensor means comprising a plurality of sensors mounted along the transmission path.

15. The method according to claim 14, further comprising the step of configuring the motor vehicle window such that:

said actuator means is configured such that acoustic surface waves are propagated solely on said window pane;

said leading edge of said window pane comprises at least one unstable point for rapidly altering said acoustic surface waves;

said at least one unstable point comprises at least one discontinuity;

said discontinuity of each said unstable point comprises one of: a notch, a groove, an inward bend and an outward bend;

said acoustic surface waves comprise a first harmonic surface wave;

said discontinuity of each said unstable point has a linear dimension, the linear dimension of said unstable point being significantly smaller than the wave length of the first harmonic surface wave;

said actuator means and said sensor means being mounted on a portion of said window pane;

means for providing current to said actuator means and said sensor means; and said means for providing current comprising conductor plates being printed on said window pane.

16. An openable and closable motor vehicle window comprising:

a frame;

a window pane being movably disposed within said frame;

said window pane having a leading edge;

said frame having a receptacle area for accommodating said leading edge of said window pane;

said window pane being positionable between a first, closed position, wherein said leading edge of said window pane is in contact with said receptacle area of said frame, and a second, maximally open position, wherein said leading edge of said window pane is maximally retracted from said receptacle area of said frame;

means for displacing said window pane between said first position and said second position; control means for controlling said displacing means;

actuator means coupled to at least one surface of said frame and said window pane for generating acoustic surface waves and for propagating the acoustic surface waves along at least one surface of said frame and said window pane;

sensor means for detecting the propagated acoustic surface waves;

means for calibrating said actuator means in response to external influences on the propagation and detection of said acoustic surface waves;

said actuator means comprising means for propagating the acoustic surface waves along an uninterrupted transmission path comprising at least one of:

said leading edge of said window pane; and said receptacle area of said frame;

wherein said actuator means comprises a plurality of actuators mounted along the transmission path, and wherein said sensor means comprise a plurality of sensors mounted along the transmission path;

comparator means for comparing at least one characteristic of the propagated acoustic surface waves and the detected acoustic surface waves and determining a difference, in terms of at least one wave characteristic, between the propagated acoustic surface waves and the detected acoustic surface waves;

means for establishing a threshold, in terms of at least one wave characteristic, for the detected acoustic surface waves; and said control means comprising means for altering the displacement of said window pane upon breaching of the threshold by the detected acoustic surface waves.

17. The motor vehicle window according to claim 16, wherein:

said actuator means comprise a plurality of actuators mounted along the transmission path;

said sensor means comprising a plurality of sensors mounted along the transmission path.

18. The motor vehicle window according to claim 17, wherein:

said actuator means is configured such that acoustic surface waves are propagated solely on said window pane;

said leading edge of said window pane comprises at least one unstable point for rapidly altering said acoustic surface waves; and said at least one unstable point comprises at least one discontinuity.

19. The motor vehicle window according to claim 18, wherein each said at least one discontinuity comprises one of:

a notch, a groove, an inward bend and an outward bend.

20. The motor vehicle window according to claim 19, wherein:

said acoustic surface waves comprise a first harmonic surface wave;

said discontinuity of each said unstable point has a linear dimension, the linear dimension of said unstable point being significantly smaller than the wave length of the first harmonic surface wave;

said actuator means and said sensor means being mounted on a portion of said window pane;

means for providing current to said actuator means and said sensor means; and said means for providing current comprising conductor plates being printed on said window pane.

* * * * *

UNITED STATES PATENT AND TRADEMARK OFFICE
CERTIFICATE OF CORRECTION

PATENT NO.    : 6,701,673 B1
DATED         : March 9, 2004
INVENTOR(S)   : Kessler et al.

It is certified that error appears in the above-identified patent and that said Letters Patent is hereby corrected as shown below:

Column 12,
Lines 51 and 66, delete "propogated", insert -- propagated --.

Column 14,
Line 26, delete "propogated", insert -- propagated --.
Line 48, delete "flame", insert -- frame --.

Signed and Sealed this

Twentieth Day of December, 2005

JON W. DUDAS
*Director of the United States Patent and Trademark Office*